(12) United States Patent
Moody

(10) Patent No.: US 6,244,949 B1
(45) Date of Patent: Jun. 12, 2001

(54) METHOD AND APPARATUS FOR REMOVING INTERNAL ORGANS FROM A SLAIN DEER

(76) Inventor: James A. Moody, 39554 Grand River Ave., Novi, MI (US) 48375

( * ) Notice: Subject to any disclaimer, the term of this patent is extended or adjusted under 35 U.S.C. 154(b) by 0 days.

(21) Appl. No.: 09/442,475

(22) Filed: Nov. 18, 1999

(51) Int. Cl.[7] .................................................. A22C 5/00
(52) U.S. Cl. ............................................ 452/122; 452/176
(58) Field of Search ................................. 452/122, 120, 452/176

(56) References Cited

U.S. PATENT DOCUMENTS 5,123,871 * 6/1992 Van Den Nieuwelaar et al. 452/122
5,133,686 * 7/1992 Van Den Nieuwelaar et al. 452/122
5,199,922 * 4/1993 Korenberg et al. .................. 452/122
5,688,164 * 11/1997 Mill et al. ............................ 452/176

* cited by examiner

*Primary Examiner*—Willis Little
(74) *Attorney, Agent, or Firm*—Charles W. Chandler

(57) ABSTRACT

The internal organs of a slain deer are removed from the animal cavity by sealing the rectum passage prior to forming an access slit along the deer belly. An annular (tubular) cutter is rotated on the deer rump to sever a plug of flesh containing the anus, after which the cutter is drawn away from the deer carcass to expose the rectum. A cord is tied around the exposed rectum so that the rectum is sealed against the escape of waste material when the deer belly is cut to gain access to the internal organs.

7 Claims, 2 Drawing Sheets

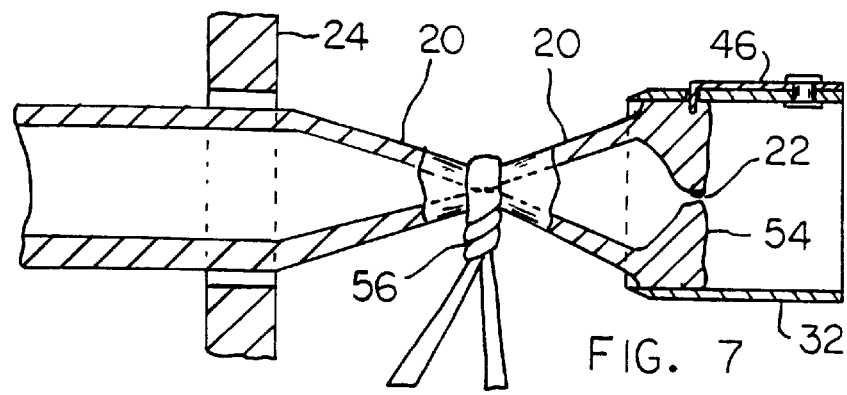
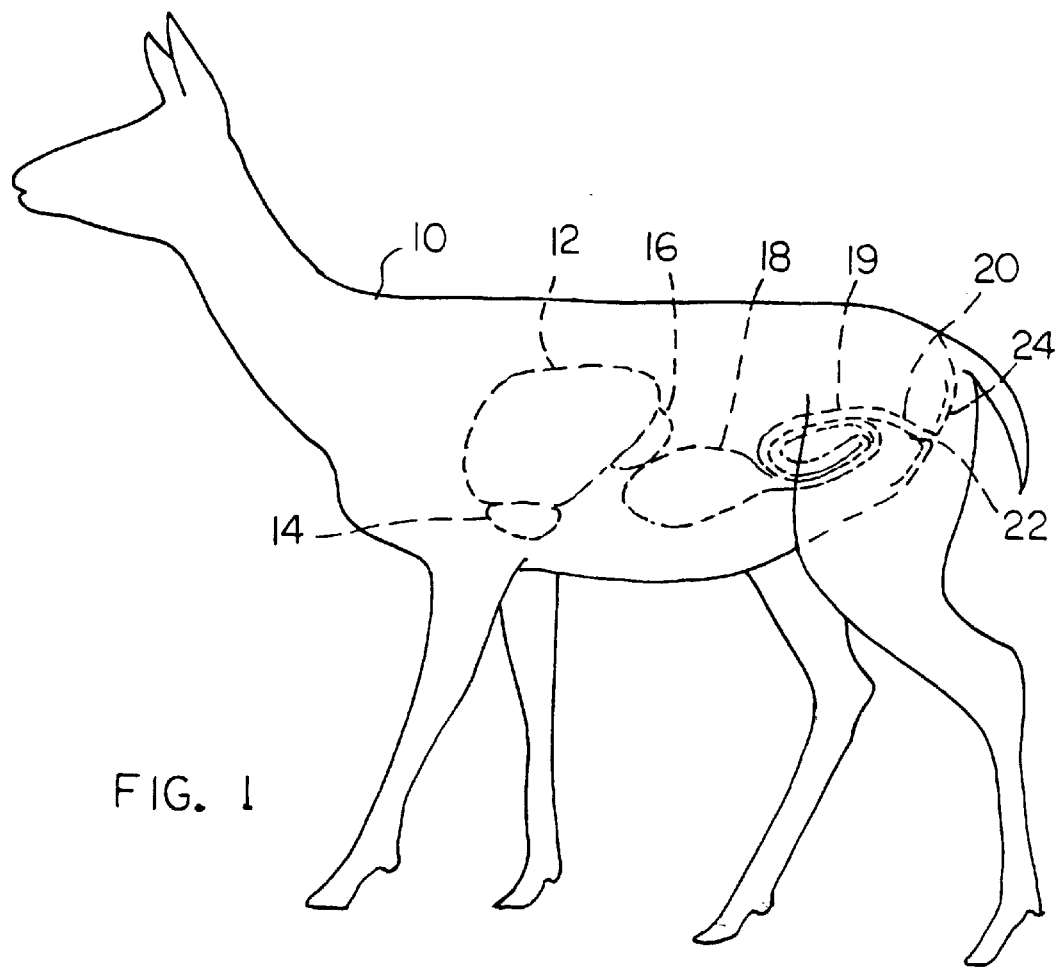

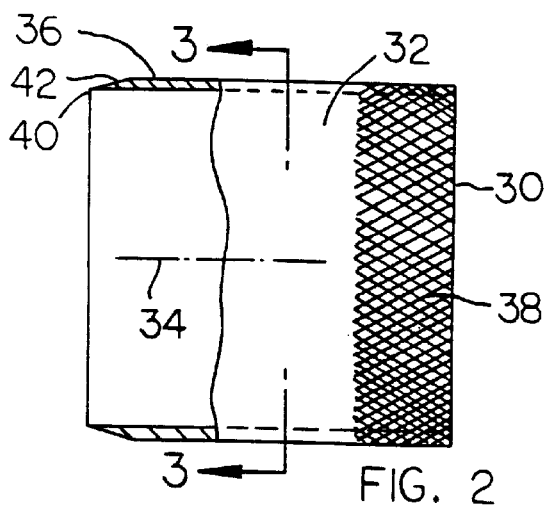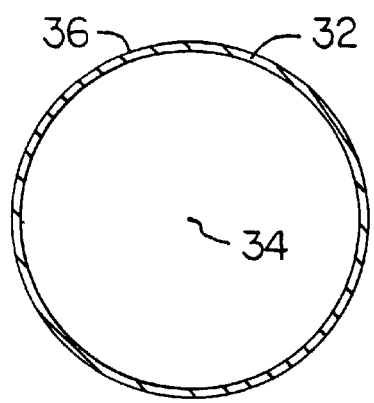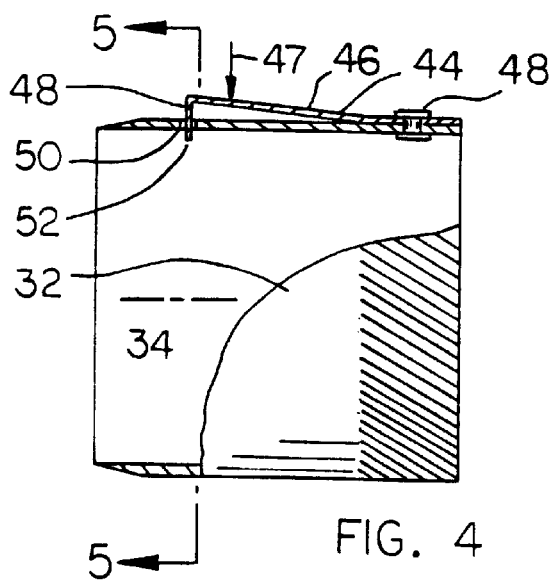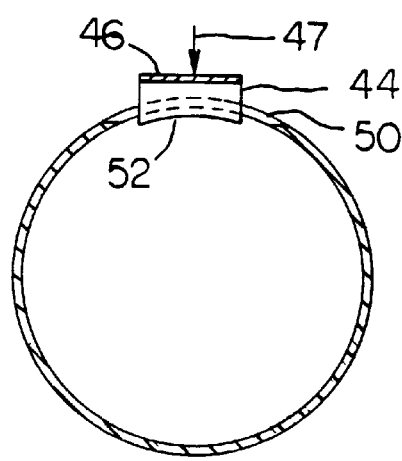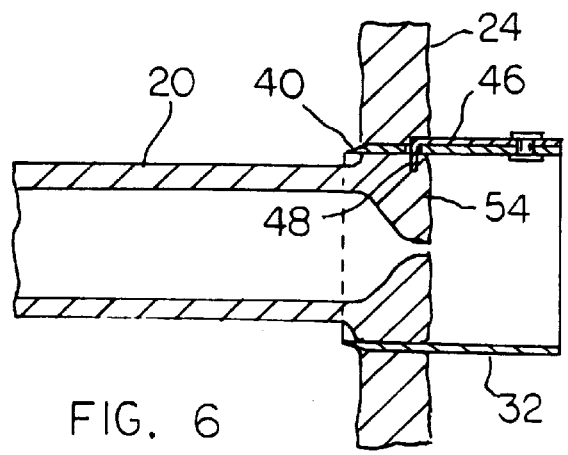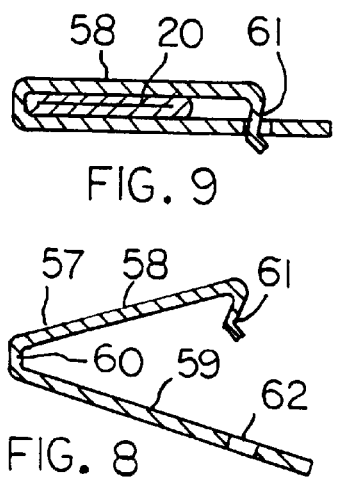

METHOD AND APPARATUS FOR REMOVING INTERNAL ORGANS FROM A SLAIN DEER

BACKGROUND AND SUMMARY OF THE INVENTION

This invention relates to a method and apparatus for removing internal organs from game animal, such as a deer.

Hunter's in the process of field dressing game animals, have to cut out and remove the anus and anal tract. Usually they perform this operation with a knife, sometimes a dull knife. This leads to a messy job, damaging and tainting or spoiling the meat.

This invention concerns the employment of a hollow tubular cutting tool to remove a plug section of the deer flesh containing the anal orifice of the deer carcass. The cutting tool has a sharp edge that is centered on the anal orifice of the animal. With a turning-twisting motion and a slight pushing pressure, the tool cuts through the skin to a depth of approximately 0.75 inch. The tool is then removed. At this time, the hunter may pull the anus and anal tract out if it has been detached from the intestines or tie the anal tract off and pull it back into the body cavity and discard with the balance of the intestines. This leaves a perfect round cut, which will allow the body cavity to drain better, because you have not damaged the meat in the area which normally happens when you try to perform this job with a knife.

Specific features and advantages of the invention will be apparent from the attached drawings and description of a cutting tool that can be used in the practice of the invention.

BRIEF DESCRIPTION OF THE DRAWINGS

FIG. 1 is a side elevational view of a deer, showing the internal organs that can be removed with the aid of the cutting tool of the present invention;

FIG. 2 is a side view of a cutting tool of the present invention, with one end of the tool shown in section;

FIG. 3 is a transverse sectional view taken on line 3—3 in FIG. 2;

FIG. 4 is a view taken in the same direction as FIG. 2, but showing another cutting tool embodying the invention;

FIG. 5 is a transverse sectional view taken on line 5—5 in FIG. 4;

FIG. 6 is a view of the FIG. 4 tool during usage on a deer carcass;

FIG. 7 is a view taken in the same direction as FIG. 6, but showing the cutting tool after it has been pulled away from the deer carcass;

FIG. 8 shows a clamp that can be used in the practice of the invention; and

FIG. 9 shows the FIG. 8 clamp in a closed position on an exposed section of a deer rectum.

DESCRIPTION OF A PREFERRED EMBODIMENT OF THE INVENTION

FIG. 1 shows a deer 10 that is often hunted by hunters with rifle or bow and arrow. As schematically depicted in FIG. 1, the deer has internal organs, such as the lungs 12, heart 14, liver 16, stomach 18, intestines 19, and rectum 20. The rectum forms an anus (opening) 22 in the rump surface 24 of the deer.

Internal organs 18, 19, 20 and 22 form a part of the alimentary canal (or passage) that digests the food eaten by the deer. The deer eliminates solid waste through anus 22.

When the deer is slain, it is necessary to remove the internal organs (viscera) from the deer carcass. This is commonly done by the hunter at the location of the deer kill. The slain deer is positioned with the belly facing upwardly so that a longitudinal slit can be cut along the belly centerline (midway between the legs). The hunter then reaches into the body cavity to cut the various organs away from the internal surfaces of the back and sides of the deer carcass.

The present invention relates to a cutting tool designed to facilitate removal of the stomach and intestines intact (without rupturing or cutting into either of these organs). By keeping these two organs intact, any waste material in these organs is prevented from escaping onto the deer carcass where such material could pose a health hazard (when the meat is eaten). Meat contaminated with animal waste material cannot be safely consumed.

Under the present invention, rectum 20 is sealed (closed) before the belly of the deer carcass is slit to expose the internal organs. With rectum 20 in a closed condition, the belly of the deer carcass can be slit to expose the internal organs for removal, without danger that waste material could escape from the intestines through a rupture in the rectum or intestine wall.

Sealing (or closure) of rectum 20 is accomplished by a two step process that involves separating anus 22 from the deer carcass, and pulling the anus away from the deer carcass to expose rectum 20; with the rectum exposed, a cord can be tied around the exposed rectum to seal the rectum passage against escape of waste material. As previously noted, this two step process is performed before forming the longitudinal slit in the belly of the deer carcass. When the belly is slit open, the rectum is already sealed against undesired escape of waste material from the intestines.

FIGS. 2 and 3 show a tubular cutting tool that can be used to separate anus 22 and rectum 20 from the deer carcass. As shown, cutting tool 30 includes a hollow tube 32 having an axis 34 and a cylindrical side wall 36 concentric around the axis. The external surface of the tube is knurled, as at 38, to provide an annular roughened surface that enables the hunter to have a good grip on the tube, whereby the tube can be rotated and at the same time pressed against the rump area of the deer carcass.

Annular edge 40 of the tube 32 is sharpened by machining a beveled surface 42 on the tube outer surface. Sharpened end edge 40 is pressed against the deer carcass to slice through the skin and tissue approximately 0.75 inch. By manually rotating tool 30 around tube axis 34, it is possible to remove a plug section of the deer flesh from the deer carcass.

You may at this time pull the anus and anal tract out if it has been detached from the intestines, or tie off the anal tract and insert it back into the body cavity or pull it back into the body cavity to discard it with the balance of the intestines.

FIGS. 4 and 5 show another annular cutting tool that can be used in practicing the invention. The tool is similar to the tool of FIGS. 2 and 3, except that the FIG. 4 tool has a clamp mechanism that facilitates retention of the plug of deer flesh within tube 32, especially when the tube is pulled away from the deer carcass to expose rectum 20.

As shown in FIGS. 4 and 5, the clamp mechanism 44 includes a strip of spring steel 46 extending along the outer surface of tube 32. A rivet 48 or other fastener means (not shown) is used to secure the right end portion of steel strip 46 to tube 32. The left end portion of strip 46 is turned, as at 48, to extend to through a slot 50 in the tube 32 wall, so that the terminal edge 52 of steel strip 46 is located within the tube (as depicted in FIG. 4).

FIG. 4 shows steel strip 46 in its normal position. Application of a manual thumb pressure on strip 46 (as denoted by arrow 47) moves turned end 48 toward the tube axis so that edge 52 can exert a clamp action against a plug of animal flesh located within tube 32. When manual pressure is removed from spring steel strip 47, the strip returns to the FIG. 4 condition.

FIGS. 6 and 7 show the FIG. 4 tool during usage on a deer carcass. As shown in FIG. 6, tube 32 is manually rotated and pressed against the rump area 24 of the deer carcass so that sharpened edge 40 slices into the deer flesh, whereby a plug section of deer flesh 54 is formed and retained within tube 32. When sharpened edge 40 has completely pierced the flesh area surrounding anus 22, the hunter can press down on steel strip 46 to cause turned end 48 of the strip to exert a clamping force on the severed flesh section 54. The clamp facilitates the operation of pulling flesh section 54 away from the deer carcass.

FIG. 7 shows the FIG. 4 tool pulled away from the deer carcass to expose rectum 20. With the rectum exposed, a flexible cord 56 can be tied tightly around the rectum to completely close the rectum passage. With the rectum sealed by cord 56, the annular cutting tool can be removed from the animal flesh section 54 without disturbing the seal established by cord 56.

With rectum 20 closed by cord 56, the deer carcass can be slit longitudinally along the belly area to facilitate removal of the internal organs (viscera). The operation performed by cutting tool 30 is advantageous in that the alimentary passage is sealed against escape of waste material before the belly is opened. Therefore, it is impossible for waste material to contaminate the deer meat during removal of the viscera from the animal body cavity.

Clamp mechanism 44 is an optional component for ensuring that the plug is of flesh 54 is retained within tube 32 while the tube is being pulled away from the deer carcass. In most situations, the plug of flesh will adhere to the inner surface of tube 32 with sufficient frictional force that the flesh plug will remain attached to tube 32 while the tube is being pulled away from the deer carcass. The tool shown in FIGS. 2 and 3 is operated in the same fashion as the FIG. 4 tool, except for the clamping action produced by clamp mechanism 44. The invention can be practiced with either the FIG. 4 tool or the FIG. 2 tool.

The operation of sealing the rectum 20 passage can be achieved in various ways. FIG. 7 shows a cord 56 for sealing the rectum passage. The cord can be a heavy string or twine. Alternatively, the cord can take the form of a steel wire or plastic tying element.

FIGS. 8 and 9 show a further mechanism for sealing the rectum 20 passage. In this case, the sealing mechanism is a manually operated clamp 57 formed of a stiff bendable material, e.g. a steel or plastic strip. As shown, the clamp includes two flat major walls 58 and 59 connected together by an integral hinge 60. Wall 58 has a deflectable tang 61 adapted to extend through a slot-like opening 62 in wall 59.

FIG. 8 shows the normal condition of the clamp, wherein three major walls 58 and 59 diverge to form an open mouth. The clamp can be slipped laterally onto the rectum 20, after which walls 58 and 59 can be brought toward each other so that tang 61 exerts a detent force on an edge of slot 62, as shown in FIG. 9. The clamp serves as a device for sealing the rectum passage 20 against escape of waste material.

During the subsequent operation of removing the internal organs from the cavity in the deer carcass, it is necessary to cut the stomach away from the cavity internal surface. The stomach and intestines can be removed from the cavity intact, since the rectum end of the intestines is sealed, but already separated from the carcass by the above-described procedure.

The invention is concerned primarily with the tubular cutters shown in FIGS. 2 through 5. Either of these cutters is advantageous in that the cutter can be targeted onto the anus surface of the animal flesh, without worry that the anus might be cut so as to inadvertently spill waste material. Use of a knife to cut around the anus does not have the precision or accuracy of the illustrated tubular cutter.

In addition, the tubular cutter can sever a flesh plug from the deer rump in a relatively short period of time, even by a novice hunter. Additionally, the cutting operation is somewhat safer for the hunter (compared to the use of a knife). A person unskilled in the use of a knife could easily cut himself while attempting to use a knife to cut away the flesh area surrounding the anus. The tubular cutter of the present invention is very safe, since the annular knife edge 40 is in continual contact with the deer flesh during the entire cutting operation.

The tubular cutter is also advantageous by reason of its compactness. Typically, the tubular cutter can have a diameter of about one and one quarter inch, and a length of about two inches, so as to readily fit into a pocket or small compartment. The cutter can be economically formed out of commercially available steel tubing having a wall thickness of about 0.06 inches. No special tooling is required.

The drawings show specific forms that the tubular cutter can take. However, it will be appreciated that the cutter can have various configurations while still practicing the invention.

Having described my invention, I claim:

1. A cutting tool for removing a plug of flesh that contains the anus of a slain deer; said cutting tool comprising:

a hollow tube having an axis and a cylindrical side wall adapted to be grasped by a hunter, whereby the tube can be manually rotated around the tube axis; said tube having a first annular open end edge, a second annular open end edge and an unobstructed passage between the first annular end edge and the second annular end edge;

said first annular end edge being sharpened so that when the tube is manually rotated and pressed against the skin of a deer, the sharpened edge of the tube exerts a slicing action on the deer flesh, whereby a plug section of the deer flesh can be formed and retained within the hollow tube.

2. A cutting tool for removing a plug of flesh that contains the anus of a slain deer; said cutting tool comprising:

a hollow tube having an axis and a cylindrical side wall adapted to be grasped by a hunter, whereby the tube can be manually rotated around the tube axis; said tube having an annular end edge;

said annular end edge being sharpened so that when the tube is rotated and pressed against the skin of a deer, the sharpened edge of the tube exerts a slicing action on the deer flesh, whereby a plug section of the deer flesh can be formed and retained within the hollow tube;

a clamp means carried by said hollow tube for retaining a plug of deer flesh within said tube when said tube is withdrawn from a deer carcass after a flesh cutting operation of the tool; and the cylindrical side wall of said hollow tube having an outer surface and an inner surface; said clamp means comprising an elongated spring leaf having a first end portion thereof fixed to the outer surface of said cylindrical side wall, and a second angularly turned end portion thereof extending through the tube side wall.

3. The cutting tool of claim 2, wherein said cylindrical side wall has an inner surface and an outer surface; said end edge being beveled on the outer surface of the cylindrical side wall to form said sharpened end edge.

4. The cutting tool of claim 3, wherein the outer surface of said cylindrical side wall is knurled around the entire circumference of the hollow tube, whereby the hunter is enabled to have a good frictional grip on the knurled surface while imparting a rotational force to the tube.

5. The cutting tool of claim 2, wherein said spring leaf has an L-shaped cross section.

6. The cutting tool of claim 5, wherein said spring leaf has a normal retracted position projecting a relatively slight distance through the tube side wall and an actuated position projecting a relatively great distance through the tube side wall.

7. A method for removing internal organs from a slain deer carcass comprising:
- (a) rotating and simultaneously pressing a tubular cutting tool against an area of the deer that contains the anus, so as to cut out and retain a plug section of the deer flesh within the tubular tool;
- (b) manually actuating a clamp associated with the tubular cutting tool, so that the clamp exerts a grip action on the plug section of the flesh located within the tool;
- (c) pulling the cutting tool away from the deer carcass to expose a section of the deer rectum; and
- (d) closing the exposed section of the rectum to seal the rectum against escape of waste material from the alimentary canal.

\* \* \* \* \*